United States Patent Office 2,945,846
Patented July 19, 1960

2,945,846

POLYMERIZATION OF OLEFINS WITH CATALYST OF ALUMINUM TRIBUTENYL AND TITANIUM TETRACHLORIDE

Karl Wisseroth and Ernst-Guenther Kastning, Ludwigshafen (Rhine), Germany, assignors to Badische Anilin- & Soda-Fabrik Aktiengesellschaft, Ludwigshafen am Rhine, Germany No Drawing. Filed July 13, 1956, Ser. No. 597,592

Claims priority, application Germany July 19, 1955

1 Claim. (Cl. 260—94.9)

This invention relates to the production of polymerization products from olefinically unsaturated hydrocarbons in the presence of catalysts.

We have found that high molecular weight polymerization products are obtained from olefinically unsaturated hydrocarbons by polymerizing them with mixtures of an alkenyl compound of a metal of the 1st, 2nd or 3rd main group of the periodic system of the elements and a compound of a metal of the 4th to 6th subgroups of the periodic system of the elements. Among the olefinically unsaturated hydrocarbons to be thus polymerized there belong in particular the olefines, especially with up to about 10 carbon atoms and preferably up to 6 carbon atoms, as for example ethylene, propylene, normal-butylene, isobutylene and mixtures of olefines, and also diolefines, such as butadiene and methylbutadienes, as well as vinyl aromatics, in particular styrene and its homologues and derivatives, as well as mixtures of the same.

Especially suitable compounds of a metal of the 4th to 6th subgroups of the periodic system are for example titanium tetrachloride, titanium trichloride, zirconium tetrabromide, the halides of hafnium, titanium tetralkyl esters, as for example tetraethoxy titanate, vanadium oxytrichloride, vanadium tetrachloride, halides of niobium and tantalum, chromyl chloride ($CrO_2Cl_2$) and halides of molybdenum, tungsten and uranium and in general compounds of the formula $MeX_p$ or $MeO_mX_n$ in which Me is a metal of the 4th to 6th subgroups, O is oxygen and X is halogen or a monovalent atomic group, such as —CN, —SCN, —OR (R being cycloalkyl, aryl and in particular alkyl with up to about 8 carbon atoms, preferably up to 4 carbon atoms), or the acetylacetonate radical, $p$ is the valency of the metal, $m$ is 1 or 2, $n$ is an integer between 1 and 4 and $m+n$ is not more than 6. Less useful results are obtained with compounds of metals of the 7th or 1st subgroups of the periodic system of elements, the 8th group or mercury.

Especially suitable alkenyl compounds of metals of the 1st, 2nd or 3rd main group are those of the metals lithium, sodium, potassium, beryllium, magnesium, calcium, aluminium or gallium. These compounds contain aliphatic radicals preferably with up to 6 carbon atoms, but the hydrocarbon chain may also be longer, for example up to 10 carbon atoms or more. The ethylenic double linkage contained therein is preferable in the beta-position, but alpha-alkenyl compounds can frequently also be employed well. For example allyl sodium, pentenyl potassium, isobutenyl sodium, tributenyl aluminium, allyl magnesium chloride or vinyl magnesium bromide are especially advantageous. The preferred compounds have the general formula $Me(R)_n$, wherein Me is a metal selected from the group consisting of sodium and aluminum, R is an alkenyl radical selected from the group consisting of allyl and butenyl, and $n$ is the valence of Me.

In a discontinuous operation, it may be preferable to bring the metal alkenyl compound, suspended in a saturated aliphatic or cycloaliphatic hydrocarbon, for example in pentane, hexane, octane, diesel oil or diesel oil fractions, gasoline or gasoline fractions, cyclohexane, decaline or, in some cases, also in an aromatic hydrocarbon, for example benzene or toluene, into the reaction apparatus before the commencement of the polymerization, while the compound of a metal of the 4th to 6th subgroups is preferably not added until immediately before the introduction of the monomers to be polymerized; but the sequence of addition may be as desired. When working continuously, the compound of a metal of the 4th to 6th subgroups, for example in 0.1 to 3 percent solution, may be supplied to the apparatus through a pump. The compound of a metal of the 4th to 6th subgroups is preferably used dissolved or suspended in an indifferent organic solvent, in particular one of the said hydrocarbons. The metal alkenyl compound suspended or dissolved in the solvent may also be supplied through a second pump or stirred to a viscous paste, preferably also with the aid of the solvent, if desired with an addition of paraffin oil, and supplied through a paste press. By simultaneously withdrawing the polymer formed in the form of a suspension in the solvent, the process can be carried out in a completely continuous manner very conveniently.

The metal alkenyl compounds are preferably used in amounts of 0.1 to 2 percent with reference to the solvent, but smaller or larger amounts may be of advantage. The process can be carried out under normal pressure or also under increased pressure up to about 300 atmospheres or more. The reaction temperature preferably lies between 0° C. and 200° C. but in some cases lower temperatures down to the boiling point of the monomeric compound and also up to about 350° C. may also be used for the polymerization. It is favorable to work while excluding atmospheric oxygen, but this is not essential. It is also recommendable to purify the olefine to be polymerized, in known manner, for example by leading it over reduced copper, silica gel or solid alkali hydroxide. The organic liquid can be purified with the aid of active carbon, aluminium oxide gel or silica gel. The metal compounds are preferably used in finely divided and anhydrous form.

It is characteristic of the new process that at relatively low temperatures and even under normal pressure particularly high molecular weight products are obtained at very high polymerization speeds. The purification of the resultant polymers can readily be carried out in known manner by washing with organic liquids, for example alcohols or ethers, which preferably contain small amounts of acids, such as oxalic acid or inorganic acids, for example with hydrochloric acid in methanol. The polymers have a very low ash content. They may be worked up by the methods usual for polymers derived from ethylenically unsaturated hydrocarbons. In particular they may serve for the production of injection molded articles, foils and industrial fibres and threads with especially good tensile strength values.

The following examples will further illustrate this invention but the invention is not restricted to these examples. The parts specified are parts by weight.

*Example 1*

2 parts of allyl sodium are introduced together with 1 part of titanium tetrachloride and 250 parts of petroleum ether which has been dried over sodium into a high pressure autoclave. After removal of atmospheric oxygen, ethylene is pressed in under a pressure of 200 atmospheres. After a reaction duration of 10 hours at 50° C., 114 parts of a loose and fine, pale brown colored polymer is obtained. After washing with methanol and hydrochloric acid in methanol a pure white powder having an ash content of 0.14 percent is obtained. The melting point range is 135° to 140° C. and the K-value is 112. The product may be worked up to slightly yellow colored plates and thin hard foils which are mechanically very resistant.

*Example 2*

2 parts of allyl sodium are brought into a high pressure autoclave together with 1 part of titanium tetrachloride and 250 parts of petroleum ether which has been dried over sodium. An ethylene pressure of 50 atmospheres is maintained for 12 hours by continuously forcing in ethylene. The reaction temperature thereby rises rapidly from an initial temperature of 18° C. to about 35° C. and towards the end approximates again to room temperature. About 88 parts of a polymer are obtained which has the nature of the polymer of Example 1.

*Example 3*

8 parts of isobutenyl sodium are suspended in 1,000 parts of dry cyclohexane and dripped during the course of 2 hours into a reaction vessel which contains 200 parts of cyclohexane. At the same time, and preferably during the same period, 12 parts of titanium tetrachloride in 1,000 parts of cyclohexane are introduced into the reaction vessel and through the mixture of the two components there is led a vigorous stream of ethylene. The polymerization commences immediately after the two catalyst components have been brought together. The temperature of the polymerization is kept at 10° to 15° C. by cooling. After completion of the introduction of the two catalyst components, ethylene is led into the reaction vessel for about another hour and finally a brown polymer paste is obtained. By washing with methanol the catalyst components may be readily removed, and 460 parts of white polyethylene powder are obtained. The K-value of the product is 147.

*Example 4*

5 parts of 1-pentenyl-3-potassium, suspended in 100 parts of normal octane, are introduced under nitrogen, together with 3 parts of vanadium tetrachloride and another 150 parts of normal octane into a high pressure autoclave. The mixture is then exposed to an ethylene pressure of 20 atmospheres for 10 hours at 100° C. The polymer is purified in the usual way with hydrochloric acid in methanol and 108 parts of a tough, film-forming polyethylene are obtained with the K-value 98.

*Example 5*

14 parts of allyl magnesium chloride are introduced together with 4 parts of titanium tetrachloride and a total of 300 parts of toluene under nitrogen into a high pressure autoclave. An ethylene pressure of 100 atmospheres is allowed to act on the mixture for 18 hours at 120° C. The polyethylene obtained is advantageously extracted from the reaction mass with decahydronaphthaline while heating. A pure white product having the K-value 82 is obtained which contains no ash constituents.

*Example 6*

20 parts of vinyl magnesium bromide are introduced with 7 parts of titanium tetrachloride and 300 parts of decahydronaphthaline under nitrogen into a high pressure autoclave and an ethylene pressure of 300 atmospheres is allowed to act thereon at 160° C. for 15 hours. A further 500 parts of decahydronaphthaline are added to the reaction mixture, the polyethylene formed is brought into solution by heating to 150° C. and freed from the insoluble catalyst constituents by filtration. 83 parts of polyethylene are obtained.

*Example 7*

5.5 parts of aluminium tributenyl in 200 parts of pentane and 5 parts of titanium tetrachloride in 100 parts of pentane are brought into a pressure vessel under nitrogen. The vessel is kept under an ethylene pressure of 10 atmospheres for 8 hours at 70° C. A brown paste, moist with pentane, is formed which becomes pure white upon treatment with methanol. After drying, 680 parts of polyethylene of the K-value 97 are obtained.

Instead of titanium tetrachloride, there may also be used under the same conditions titanium trichloride or titanium tetraethylate. When using titanium tetraethylate, 95 parts of polymer are obtained.

*Example 8*

4 parts of allyl sodium, suspended in 100 parts of diesel oil of the boiling point range 130° to 190° C., and 2 parts of titanium tetrachloride, dissolved in 200 parts of the diesel oil, are exposed in a pressure vessel to a propylene pressure of 20 atmospheres at 60° C. After 12 hours, 76 parts of polypropylene have been formed which is freed from catalyst constituents with hydrochloric acid in methanol. The product softens at about 100° C. If under the same conditions a gas mixture of ethylene and propylene in equal parts be allowed to act on the catalyst mixture, 168 parts of a copolymer are obtained which shows similarity in its properties with high pressure polyethylene. Methyl groups are present in this copolymer, as is shown in the infra-red spectrum.

*Example 9*

8 parts of allyl sodium, suspended in 300 parts of normal octane, and 3 parts of vanadium oxytrichloride, dissolved in 200 parts of normal octane, are brought into a pressure vessel under nitrogen and the mixture exposed at 20° C. to an ethylene pressure of 5 atmospheres. The reaction temperature is kept between 20° and 30° C. by external cooling. After about 6 hours the absorption of ethylene ends. The polymer pulp is freed from solvent and purified with methanol. 460 parts of tough, film-forming polyethylene are obtained.

By using 4 parts of chromyl chloride instead of 3 parts of vanadium oxytrichloride under otherwise the same conditions, 390 parts of polyethylene are obtained.

*Example 10*

A solution of 5 parts of titanium tetrachloride in 250 parts of cyclohexane is added to a suspension of 10 parts of allyl sodium in 250 parts of cyclohexane. Through this mixture there is led a dry stream of isobutylene. The temperature of the reaction mixture is kept between 40° and 50° C. After about 8 hours, the supply of isobutylene is discontinued and the catalyst is decomposed by the addition of methanol to the reaction mixture. The polyisobutylene solution in cyclohexane is shaken several times with methanol for purification and the solvent distilled off. 185 parts of a tough, somewhat sticky polyisobutylene remain behind.

*Example 11*

A mixture of 10 parts of allyl sodium, 5 parts of titanium tetrachloride, 200 parts of isoprene and 500 parts of cyclohexane is stirred for 48 hours at 40° C. After destroying the catalyst with methanol, 88 parts of a tough, elastic product may be isolated. This is kneaded with methanol for further purification. The polymer is vulcanizable and suitable for the production of high quality rubber varieties.

If butadiene be polymerized in the same way in a pressure vessel, 114 parts of polybutadiene are obtained.

*Example 12*

11 parts of aluminium tributenyl, 100 parts of styrene and 300 parts of normal heptane are brought under nitrogen into an autoclave and 5.7 parts of titanium tetrachloride dissolved in 50 parts of normal heptane are introduced into the same. The reaction mixture is kept at 70° C. for 5 hours. The catalyst is then decomposed and 66 parts of polystyrene are obtained which is purified with methanol. Low molecular weight constituents can be removed from the polymer with boiling normal heptane and there is obtained a polystyrene which softens at 210° to 220° C. The yield of high melting point material, which represents about 18 percent of the polymer, may be increased to 51 percent by the use of titanium trichloride instead of titanium tetrachloride.

Instead of 11 parts of aluminium tributenyl there may also be used 24 parts of allyl sodium. With a good yield of polymer, about 3 to 7 percent of high melting point polystyrene are obtained both by the use of 5.7 parts of titanium tetrachloride and by the use of 5.7 parts of titanium trichloride.

We claim:

A process for polymerizing ethylene which comprises contacting ethylene with a polymerization catalyst of a mixture of aluminum tributenyl and titanium tetrachloride.

References Cited in the file of this patent

UNITED STATES PATENTS

| | | |
|---|---|---|
| 2,606,179 | Boyd | Aug. 5, 1952 |
| 2,721,189 | Anderson | Oct. 18, 1955 |
| 2,822,357 | Brebner et al. | Feb. 4, 1958 |
| 2,839,518 | Brebner | June 17, 1958 |
| 2,843,577 | Friedlander et al. | July 15, 1958 |
| 2,879,263 | Anderson et al. | Mar. 24, 1959 |

FOREIGN PATENTS

| | | |
|---|---|---|
| 533,362 | Belgium | May 16, 1955 |

OTHER REFERENCES

"The Polymerization of Butadiene and the Production of Artificial Rubber" (Ziegler), published in Rubber Chemistry and Technology, vol. 11, 1938, pages 501–507.